United States Patent [19]

Shu et al.

[11] Patent Number: 5,219,026
[45] Date of Patent: Jun. 15, 1993

[54] ACIDIZING METHOD FOR GRAVEL PACKING WELLS

[75] Inventors: Paul Shu, Cranbury, N.J.; William P. Donlon, Dallas, Tex.; E. Thomas Strom, Dallas, Tex.; Lloyd G. Jones, Dallas, Tex.

[73] Assignee: Mobil Oil Corporation, Fairfax, Va.

[21] Appl. No.: 810,665

[22] Filed: Dec. 19, 1991

Related U.S. Application Data

[63] Continuation-in-part of Ser. No. 622,587, Dec. 3, 1990, Pat. No. 5,101,901.

[51] Int. Cl.$^5$ .............. E21B 33/138; E21B 43/04; E21B 43/27
[52] U.S. Cl. .............. 166/278; 166/281; 166/292; 166/294; 166/300
[58] Field of Search .............. 166/278, 281, 292, 293, 166/294, 295, 300

[56] References Cited

U.S. PATENT DOCUMENTS

| | | | |
|---|---|---|---|
| 2,308,425 | 1/1943 | Prince | 166/281 |
| 3,339,633 | 9/1967 | Richardson | 166/295 |
| 3,437,143 | 4/1969 | Cook | 166/285 |
| 3,517,745 | 6/1970 | Suman, Jr. | 166/297 |
| 3,709,298 | 1/1973 | Pramann | 166/295 X |
| 3,743,020 | 7/1973 | Suman, Jr. et al. | 166/281 X |
| 3,820,604 | 6/1974 | Karnes | 166/297 |
| 3,918,521 | 11/1975 | Snavely, Jr. et al. | 166/272 |
| 4,304,301 | 12/1981 | Sydansk | 166/292 |
| 4,440,227 | 4/1984 | Holmes | 166/261 |
| 4,479,894 | 10/1984 | Chen et al. | 252/8.554 |
| 4,489,783 | 12/1984 | Shu | 166/272 |
| 4,513,821 | 4/1985 | Shu | 166/273 |
| 4,549,608 | 10/1985 | Stowe et al. | 166/280 |
| 4,645,005 | 2/1987 | Ferguson | 166/278 |
| 4,669,542 | 6/1987 | Venkatesan | 166/258 |
| 4,785,883 | 11/1988 | Hoskin et al. | 166/300 X |
| 4,807,703 | 2/1989 | Jennings, Jr. | 166/307 |
| 4,842,057 | 6/1989 | Lubitz | 166/51 |
| 5,072,791 | 12/1991 | Whitebay | 166/278 |
| 5,088,555 | 2/1992 | Shu | 166/297 X |

Primary Examiner—George A. Suchfield
Attorney, Agent, or Firm—A. J. McKillop; G. W. Hager; C. A. Malone

[57] ABSTRACT

A method for gravel packing perforations in a wellbore where an acid is directed into the perforations so as to dissolve formation fines in channels contained in said perforations. The acid is of a strength sufficient to dissolve said fines. After the fines are dissolved, a three slug sand consolidating agent is introduced into the perforations before the channels can be filled with formation fines. The consolidating agent remains in the perforations for a time sufficient to form a silicate cement in situ which cement has permeability retentive characteristics. The cement forms pores of a size sufficient to exclude formation fines from the wellbore. Thereafter, the wellbore is packed with gravel to remove any escaping fines from hydrocarbonaceous fluids produced to the surface.

13 Claims, 1 Drawing Sheet

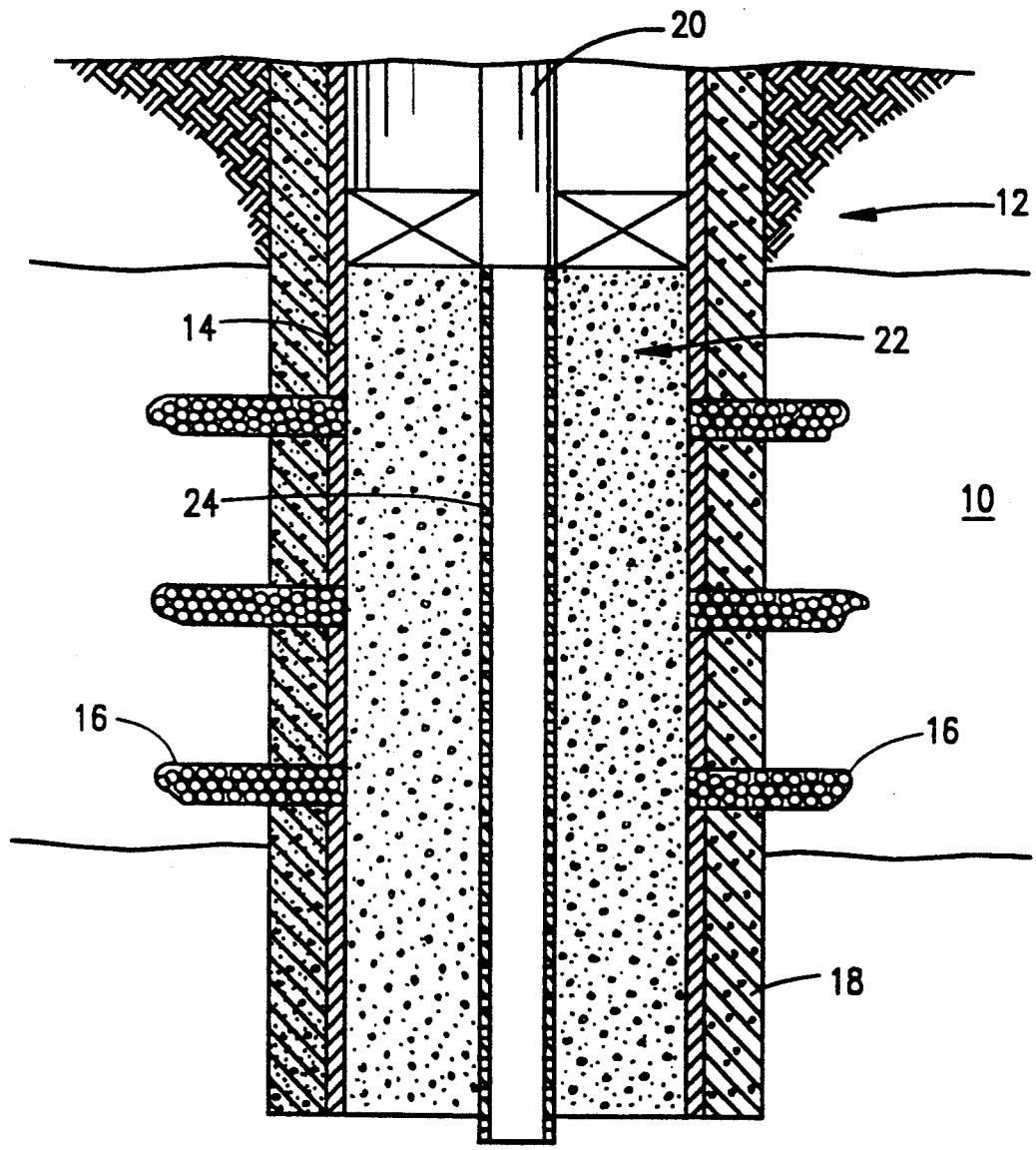

ACIDIZING METHOD FOR GRAVEL PACKING WELLS

This application is a continuation-in-part of Ser. No. 07/622,587, which was filed, on Dec. 3, 1990.

FIELD OF THE INVENTION

This invention relates to a sand control method for completing wells in poorly consolidated or unconsolidated formations.

BACKGROUND OF THE INVENTION

In completing wells in poorly consolidated or unconsolidated formations, consideration must be given to sand problems likely to arise during the operation of the well. The incompetent nature of this type of formation requires that a well completion technique include means for excluding sand production. Erosion and plugging effects of sand entrained in produced fluids are well known and if not arrested can seriously reduce well productivity.

The propensity of a formation to produce sand is particularly acute in formations characterized as unconsolidated or poorly consolidated. These terms, as applied to subterranean sedimentary deposits, define a particular class of sedimentary rock, the distinguishing characteristic of which is the absence of a rock matrix made up of sand grains bound into a cohesive mass.

A widely used sand control technique is the gravel pack installation which operates on the principle of forming a sand exclusion zone in surrounding relation to the wellbore. The sand exclusion zone composed of particularly graded aggregate screens out or bridges the formation sand entrained in the produced fluids. The typical gravel pack completion involves the placement of aggregate in the immediate vicinity of the wellbore and the provision of a support means for maintaining the aggregate in place. The aggregate is generally a specially graded sand or gravel, but can be other particulate material such as walnut shells, glass beads, and the like.

The placement of the aggregate immediately adjacent to the producing formation presents a major source of trouble in performing the gravel pack installation. Packing gravel into perforations is usually achieved by squeeze packing. Squeeze gravel packing is a two-stage process which includes (1) transportation of gravel slurry down through the pipe; and (2) gravel pack buildup at the formation face as fluid leaks off through the formation. In gravel packing of heterogeneous pays, frequently those perforations penetrating a lower permeability formation are at best partially packed. Additionally, even when properly packed, fluids are not produced through some perforations because formation fines accumulate in channels of the formation prior to gravel packing them. Accumulation of fines within these channels prevent hydrocarbonaceous fluids from flowing out of the reservoir into the wellbore for production to the surface.

Therefore, what is needed is a method to prevent fines from accumulating and plugging perforation channels prior to gravel packing perforations so as to increase the production of hydrocarbonaceous fluids from a reservoir.

SUMMARY OF THE INVENTION

This invention is directed to a method for gravel packing a perforated well which penetrates a formation or reservoir. In the practice of this invention an acidizing solution is directed into perforations of a wellbore. This acidizing solution is of a composition and strength sufficient to dissolve formation sand or fines within the perforations as well as channels within the perforations which communicate with the formation and transport formation fluids into the wellbore. After the acidizing solution has removed the fines, the acidizing solution is removed from the wellbore. To prevent the channels from again filling with formation sand or fines, a consolidating agent with permeability retentive characteristics is introduced into the wellbore and perforations.

The consolidating agent consolidates and binds sand grains together in said formation adjacent to the perforations. Having bound the sand grains together, the formation area adjacent to the perforations is thus consolidated. The concentration and flow rate of the consolidating agent is controlled so as to retain a desired permeability within the formation sufficient to preclude formation fines from plugging channels communicating with the formation via the perforations while allowing hydrocarbonaceous fluids to flow into the wellbore.

After consolidating the formation to preclude fines from flowing into channels communicating with the perforations, the perforations are packed with a gravel packing sand of a size sufficient to further assure that formation fines will not enter the wellbore with produced hydrocarbonaceous fluids.

It is therefore an object of this invention to effectively clear formation sand or fines from perforation channels prior to gravel packing them to prevent said channels from plugging.

It is another object of this invention to increase the life and efficiency of perforation gravel packs.

It is yet another object of this invention to maintain high sand- or fines-free fluid productivity from wells.

It is a yet further object of this invention to provide for a more efficient and uniform manner of packing perforations within a wellbore so as to minimize downtime and repacking operations.

BRIEF DESCRIPTION OF THE DRAWING

The drawing is a schematic representation of a wellbore wherein a gravel pack operation is conducted after having acidized channels in the perforations and consolidating the formation area adjacent to the perforations.

DESCRIPTION OF THE PREFERRED EMBODIMENTS

In the practice of this invention referring to the drawing, an acidizing agent is directed into wellbore 12 which penetrates sand bearing formation 10. The wellbore contains a casing 14 and a cement sheath 18. Cement sheath 18 and casing 14 are penetrated by perforations 16. Tubing 20 extends down wellbore 12 and has affixed thereto slotted liner 24 thus forming annulus 22 between casing 14 and slotted liner 24. The acidizing agent exits slotted liner 24 whereupon it enters annulus 22 and subsequently perforations 16. Perforations 16 contain channels (not shown) which communicate with formation 10. These channels are cleared of formation fines by the acidizing agent. The acidizing agent is flowed through perforations 16 into formation 10 at a rate and concentration sufficient to remove formation sand or fines from the channels. Once sufficient time has elapsed to remove formation sand or fines from channels communicating with perforations 16 in formation 10, the acidizing agent is removed from the wellbore via slotted liner 24 and tube 20.

The acidizing agent which is used herein comprises an inhibited acid. Acids which can be utilized include hydrofluoric acid, hydrochloric acid, formic acid, acetic acid, gel acids and other similar acids known to those skilled in the art. As will be understood by those skilled in the art, the acid utilized will depend upon the composition of the formation fines and also the composition of the formation. As is expected, in most instances hydrofluoric acid will be utilized. After the elapse of a time required to dissolve the formation sand or fines from the channels of the perforations, the acidifying agent is removed from the wellbore. Acid compositions which can be used in acidizing sandstone formations are disclosed in U.S. Pat. No. 4,807,703 which issued to Jennings, Jr. on Feb. 28, 1989. This patent is hereby incorporated by reference herein.

After removing the acidizing solution from the wellbore, a sand consolidating agent is introduced into wellbore 12 in the manner similar to the introduction of the acid. The sand consolidating agent which is utilized enters the perforations and channels communicating therewith and formation 10. The consolidating agent which is utilized is able to retain the permeability of the formation while permitting hydrocarbonaceous fluids to flow from formation 10 into wellbore 12 substantially sand- or fines-free. The concentration of the consolidating agent is such as to consolidate and bind sand grains in the formation. Bound sand grains thus form a barrier to the entry of formation fines from the formation into channels contained in the perforations. In order to obtain a desired pore size in the channels and formations, additional slugs of the consolidating agent are injected or introduced into formation 10 via perforations 16 and wellbore 12.

A consolidating agent which can be used herein comprises an aqueous organoammoniom silicate, alkali metal or ammonium silicate slug that is injected into well 12 where it enters formation 10 via perforations 16. A method for perforating a wellbore is disclosed in U.S. Pat. No. 3,437,143 which issued to Cook on Apr. 8, 1969. This patent is hereby incorporated by reference herein. As the aqueous slug containing the organoammonium silicate, alkali metal or ammonium silicate proceeds through formation 10, it fills the pores in the formation.

As the aqueous organoammonium silicate, alkali metal or ammonium silicate solution proceeds through formation 10, it deposits a film of said aqueous silicate on sand grains therein. This aqueous silicate also fills intersitial spaces between the sand grains. Next, a spacer volume of a water-immiscible hydrocarbonaceous liquid is directed through formation 10 so as to remove excess aqueous silicate from the intersitial spaces while leaving sufficient aqueous silicate adhering filmwise to the sand grains. The hydrocarbonaceous liquid comprises paraffinic and aromatic hydrocarbons.

This spacer volume of water-immiscible hydrocarbonaceous liquid is selected from a member of the group consisting of mineral oils, naphthas, $C_5$–$C_{40}$ alkanes and mixtures thereof. Hydrocarbonaceous liquids used as a spacer volume can be of an industrial grade. A spacer volume of hydrocarbonaceous liquid is used to remove excess aqueous silicate from between the sand grains while allowing a thin silicate film to remain on the surface to obtain a cementing reaction with a subsequently injected water-miscible organic solvent containing an alkylpolysilicate and hydrated calcium chloride.

Afterwards, a water-miscible organic solvent containing an alkylpolysilicate and hydrated calcium chloride mixture therein is injected into formation 10 where it forms in-situ a permeability retentive silicate cement which is stable to temperatures up to and in excess of about 400° F. Once the silicate cement has hardened and formation 10 has been consolidated to the extent desired, by repeated applications if necessary, an EOR operation is initiated in formation 10.

The cementing reaction which takes place binds sand grains in the formation, thereby forming a consolidated porous zones within the formation adjacent the wellbore. Although the sand grains are consolidated, a cement is formed which results in a substantially high retention of the formation's permeability.

In order to increase the cement's consolidation strength, the concentration of the organoammonium silicate, alkali metal silicate or ammonium silicate contained in an aqueous slug or the alkylpolysilicate and hydrated calcium chloride contained in the organic solvent slug can be increased. Similarly, the flow rates of each of these slugs through the formation can be decreased to obtain better consolidation strength. A decreased flow rate is particularly beneficial for increasing the consolidation strength when the alkylpolysilicate and hydrated calcium chloride slug's flow rate is decreased. As will be understood by those skilled in the art, optimal concentrations and flow rates are formation dependent. Therefore, optimal concentrations and flow rates should be geared to field conditions and requirements.

Injection of aqueous organoammonium silicate, alkali metal or ammonium silicate slug and organic solvent slug containing the alkylpolysilicate and hydrated calcium chloride can be continued until the formation has been consolidated to a strength sufficient to prevent caving and damage to the wellbore. As will be understood by those skilled in the art, the amount of components utilized is formation dependent and may vary from formation to formation. Core samples obtained from the interval to be treated can be tested to determine the required pore size and amount of cement needed. U.S. Pat. No. 4,459,608 which issued to Stowe et al. teaches a method of sand control where clay particles are stabilized along a face of a fracture. This patent is incorporated by reference herein.

Once the channels within formation 1 and perforations 16 have been consolidated with the desired amount of permeability, any remaining consolidating agent is removed from the wellbore. Afterwards, the perforations are packed with gravel. Methods for gravel packing a well are known to those skilled in the art. One such method is a squeeze packing method. A method for squeeze packing a wellbore is discussed in U.S. Pat. No. 4,842,057. This patent is hereby incorporated by reference herein.

In order to obtain an effective gravel pack of perforations contained in the wellbore, it is necessary that the packing sand be transported to the perforations with the sand dispensed uniformly therein. For effective gravel packing, sand which is transported in a carrier liquid should remain dispersed in the carrier liquid until it reaches the perforations to be packed. Upon reaching the perforations, the sand should uniformly pack within the perforations and the liquid should leak-off into the formation easily.

A retrievable gravel packer and retrieving tool which can be used in the practice of this invention is discussed in U.S. Pat. No. 4,842,057 which issued to Lubiz on Jun. 27, 1989. This patent is hereby incorporated by reference herein. Gravel packing sand which can be utilized herein will generally have a U.S. sieve size of from about 6 to about 70.

Once the gravel packing operation has been completed, the well is placed back on production. Fluids which flow from the formation into the wellbore will be substantially fines- or sand-free since they are prevented from entering the formation by the permeability retentive consolidated sand which has been formed. Thus, substantially fines free hydrocarbonaceous fluids will be produced from the well to the surface.

If desired, an enhanced oil recovery method can be conducted in the formation after completion of the gravel packing operation. Steam-flooding processes which can be utilized after completion of the sand consolidating and gravel packing process described herein are detailed in U.S. Pat. Nos. 4,489,783 and 3,918,521 which issued to Shu and Snavely, respectively. U.S. Pat. No. 4,479,894 that issued to Chen et al. describes a water-flooding process which may be used herein. Fireflooding processes which can be utilized herein are disclosed in U.S. Pat. Nos. 4,440,227 and 4,669,542 which issued to Holmes and Venkatesan, respectively. These patents are hereby incorporated by reference herein.

A carbon dioxide EOR process which can be used after consolidating the higher permeability zone is disclosed in U.S. Pat. No. 4,513,821 which issued to W. R. Shu on Apr. 30, 1985. This patent is hereby incorporated by reference herein.

Organoammonium silicate, ammonium or alkali metal silicates which are utilized should have a $SiO_2/M_2O$ molar ratio is in the range of about greater than 2. The concentration of the silicate solution is about 10 to about 60 wt. percent, preferably 20 to about 50 wt. percent. As will be understood by those skilled in the art, the exact concentration should be determined for each application. In general, concentrated silicate solutions are more viscous and form a stronger consolidation due to a higher content of solids.

In those cases where it is not possible to control the viscosity of the silicate solution and preclude entry into a lower permeability zone, a mechanical packer may be used. The silicate cement which is formed can withstand pH's of 7 or more and temperatures up to and in excess of about 400° F. The preferred silicates are sodium, lithium and potassium. Potassium is preferred over sodium silicate because of its lower viscosity. Fumed silica, colloidal silica, or other alkali metal hydroxides can be added to modify the $SiO_2/M_2O$ molar ratio of commercial silicate. Colloidal silicate can be used alone or suspended in an alkali metal or ammonium silicate as a means of modifying silicate content, pH, and/or $SiO_2$ content. In a preferred embodiment, two parts of the aqueous silicate is mixed with one part colloidal silicate.

Organoammonium silicates which can be used in an aqueous solution include those that contain $C_1$ through $C_8$ alkyl groups and hetero atoms. Tetramethylammonium silicate is preferred.

Alkylpolysilicate (EPS) contained in the water-miscible organic solvent is the hydrolysis-condensation product of alkylorthosilicate according to the reaction equation below:

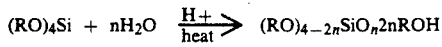

where
n $\leq$ 2 and
R = $C_1$-$C_{10}$
R should be $\leq$ 10 carbons for good solubility and high $SiO_2$ content.

Tetramethyl (TMS) or tetraethylorthosilicates (TEOS) are preferred. Mixed alkylorthosilicate can also be used. It is desirable to obtain an alkylpolysilicate with n > 0.5, preferably n greater than 1. As n increases, the $SiO_2$ content increases, resulting in stronger consolidation. It is desirable to use an alkylopolysilicate with a silica content of 30% or more, preferably about 50%. EPS which is used herein is placed into a water-miscible organic solvent. The preferred solvent is ethanol. Of course, other alcohols can be used. EPS, TMS, TEOS, or other alkylpolysilicates are contained in the solvent in an amount of from about 10 to about 90 weight percent which is sufficient to react with the silicates contained in the aqueous solution. Although alcohol is the solvent preferred because of its versatility and availability, other water-miscible organic solvents can be utilized. These solvents include methanol and higher alcohols, glycols, ketones, tetrahydrofuran (THF), and dimethyl sulfoxide (DMSO).

Although ethanol is the preferred solvent, higher alcohols also can be utilized, as well as other solvents capable of dissolving alkylpolysilicates. The concentration of alkylpolysilicate should be in the range of about 10 to about 100 wt. percent, preferably 20 to about 80 wt. percent. Of course, enough alkylpolysilicate should be used to complete the reaction with the organoammonium silicate, alkali metal or ammonium silicate.

The calcium salt which can be used herein is one which is soluble in alcohol or the water-miscible organic solvent. Calcium chloride hydrate is preferred. However, chelated calcium forms can also be used. Higher alcohols also can be utilized, as well as other solvents capable of dissolving calcium salts and chelates. The concentration of calcium chloride hydrate should be in the range of about 10 to about 40 wt. percent, preferably 20 to about 30 wt. percent. Of course, enough EPS and calcium chloride solution should be used to complete the reaction with the aqueous silicate.

In another embodiment, calcium chloride can be used alone in the organic solvent to form a silicate cement in combination with the aqueous silicate. Similarly, a spacer volume of hydrocarbonaceous liquid is used to separate the calcium chloride solution slug from the EPS organic solvent slug.

While hydrated calcium chloride is preferred, cations of other chlorides can be used. Other chlorides that can be used comprise titanium dichloride, zirconium chloride, aluminum chloride hydrate, ferrous chloride, and chromous chloride.

Although the present invention has been described with preferred embodiments, it is to be understood that modifications and variations may be resorted to without departing from the spirit and scope of this invention, as those skilled in the art readily understand. Such variations and modifications are considered to be within the purview and scope of the appended claims.

What is claimed is:

1. A method for gravel packing perforations in a well which comprises:
   a) introducing an acidizing agent into the formation's near-wellbore area via perforations within the well which acidizing agent is of a strength sufficient to dissolve formation sand or fines in channels contained in said formation and perforations;
   b) introducing thereafter, via three separate slugs, a sand consolidating agent comprising;
      i) an aqueous solution of a silicate selected from a member of the group consisting of an alkali metal silicate, ammonium silicate or organoammonium silicate,
      ii) a spacer volume of a water-immiscible hydrocarbonaceous liquid, and
      iii) a water-miscible organic solvent containing an alkylpolysilicate and a member selected from the group consisting of an inorganic salt or chelated calcium in an amount sufficient to react with said organoammonium silicate, alkali metal or ammonium silicate so as to form a permeability retentive silicate cement of a strength sufficient to bind silica-containing particles therein and preclude formation sand from being produced from said area;
   c) allowing the consolidation agent to remain in the perforations and said area for a time sufficient to form a cement having a porosity sufficient to prevent formation fines from entering said channels and perforations thereby permitting the production of substantially fines free hydrocarbonaceous fluids to the surface; and
   d) performing thereafter a gravel packing operation, thereby further preventing any escaping sand or fines from said channels from being produced to the surface.

2. The method as recited in claim 1 where the acidizing agent comprises an acid selected from a member of the group consisting of hydrofluoric acid, hydrochloric acid, formic acid, acetic acid, gel acids and mixtures thereof.

3. The method as recited in claim 1 where the alkali metal silicate comprises ions of sodium, potassium, or lithium, and mixtures thereof.

4. The method as recited in claim 1 where the alkali metal silicate has a silicon dioxide to metal oxide molar ratio of greater than about 2.

5. The method as recited in claim 1 where said alkylpolysilicate comprises tetramethyl or tetraethylorthosilicates and the inorganic salt is calcium chloride.

6. The method as recited in claim 1 where in step d) the water-miscible organic solvent is a member selected from the group consisting of methanol, ethanol, higher alcohols, glycols, ketones, tetrahydrofuran, and dimethyl sulfoxide.

7. The method as recited in claim 1 where the silicate is contained in the aqueous solution in an amount of from about 10 to about 60 weight percent.

8. The method as recited in claim 1 where alkylpolysilicate is contained in said organic solvent in an amount of about 10 to about 100 weight percent and the salt therein is in an amount from about 10 to about 40 weight percent.

9. The method as recited in claim 1 where in step d) said alkylpolysilicate is a hydrolysis-condensation product of alkylorthosilicate according to the equation below:

$$(RO)_4Si + nH_2O \xrightarrow[\text{heat}]{H+} (RO)_{4-2n}SiO_n 2nROH$$

where
n $\leq$ 2 and
R = $C_1$–$C_{10}$.

10. The method as recited in claim 1 where said silicate cement withstands temperatures in excess of about 400 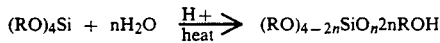 F.

11. The method as recited in claim 1 where the silicon dioxide to metal oxide molar ratio is less than about 4.

12.. The method as recited in claim 1 where said organoammonium silicate comprises $C_1$ through $C_{10}$ alkyl or aryl groups and hetero atoms.

13. The method as recited in claim 1 where in step b) said salt is a member of the group consisting of titanium dichloride, zirconium chloride, aluminum chloride hydrate, ferrous chloride and chromous chloride.

* * * * *